United States Patent [19]

Cenker et al.

[11] 4,243,756

[45] Jan. 6, 1981

[54] STABLE-LIQUID ISOCYANURATE-MODIFIED POLYISOCYANATE COMPOSITIONS

[75] Inventors: Moses Cenker, Trenton; Thirumurti Narayan, Grosse Ile, both of Mich.

[73] Assignee: BASF Wyandotte Corporation, Wyandotte, Mich.

[21] Appl. No.: 69,729

[22] Filed: Aug. 27, 1979

[51] Int. Cl.³ .............................................. C08G 18/14
[52] U.S. Cl. ....................................... 521/125; 528/52
[58] Field of Search ........................... 521/125; 528/52

[56] References Cited

U.S. PATENT DOCUMENTS

| | | |
|---|---|---|
| 3,645,979 | 2/1972 | Liebsch et al. ................... 521/161 |
| 3,652,424 | 3/1972 | Jackson et al. ..................... 528/45 |
| 3,701,756 | 10/1972 | Carleton et al. ................... 528/52 |
| 3,872,035 | 3/1975 | Papa et al. ........................ 528/52 |
| 3,899,443 | 8/1975 | Reymore et al. .................. 521/125 |
| 3,996,223 | 12/1976 | Gupta et al. ...................... 521/159 |

*Primary Examiner*—Maurice J. Welsh
*Attorney, Agent, or Firm*—Norbert M. Lisicki; Joseph D. Michaels

[57] ABSTRACT

Isocyanurate-modified polyisocyanate compositions prepared by reacting organic polyisocyanates in the presence of catalytic amounts of alkali metal or alkaline earth metal organo-hydroxamates or the metal salt-free acid complex at temperatures from 25° C. to 250° C.

10 Claims, No Drawings

STABLE-LIQUID ISOCYANURATE-MODIFIED POLYISOCYANATE COMPOSITIONS

BACKGROUND OF THE INVENTION

1. Field of the Invention

The present invention relates to isocyanurate-modified polyisocyanate compositions, to a process for the preparation thereof, and to microcellular foams prepared from said polyisocyanate compositions. More particularly, the invention relates to polyisocyanate compositions containing isocyanurate linkages prepared by reacting said polyisocyanate in the presence of an alkali metal organo-hydroxamate or the metal salt-free acid complex, hereinafter referred to as the "half-salt."

2. Description of the Prior Art

The prior art generally teaches the preparation of isocyanurate-modified isocyanate products, employing a variety of catalysts. U.S. Pat. No. 3,996,223 teaches a process for the preparation of polyurethane quasi-prepolymers containing isocyanurate structures by polymerization in the presence of catalytic quantities of a mixture of Mannich bases and carbamic acid esters from isocyanate and alcohols containing secondary alcohol groups. U.S. Pat. No. 3,645,979 teaches the polymerization of an aromatic polyisocyanate and an aliphatic polyisocyanate in the presence of an organic phosphine catalyst. U.S. Pat. No. 3,652,424 teaches a process for the preparation of polyisocyanate compositions containing 5 to 19 percent by weight of toluene diisocyanate trimer by employing as trimerization catalysts substituted guanidines and isobiguanidines.

SUMMARY OF THE INVENTION

The present invention relates to the preparation of stable, liquid isocyanate compositions in which certain amounts of isocyanate groups are converted to isocyanurate rings employing certain novel catalysts. The catalysts employed are alkali-metal and alkaline-earth metal organo-hydroxamates or the half-salts thereof.

DESCRIPTION OF THE PREFERRED EMBODIMENTS

The present invention relates to stable, liquid polyisocyanate compositions containing isocyanurate linkages prepared by heating said polyisocyanates in the presence of a catalytic amount of an alkali-metal hydroxamate or the half-salt thereof selected from the group consisting of a compound described by the following formula:

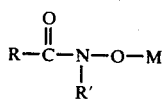

wherein R is alkyl, alkenyl, or alkynyl containing 1 to 10 carbon atoms, phenyl, tolyl, or benzyl, R' is H, alkyl, alkenyl, alkynyl containing 1 to 18 carbon atoms, phenyl, tolyl or benzyl and M is an alkali metal or an alkaline earth metal, and a compound described by the following formula:

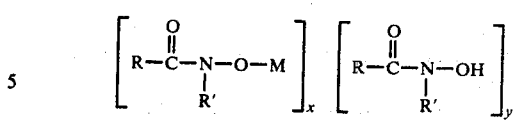

wherein R, R', and M are as defined above, x is 1, y is any number from 0 to 2. Representative hydroxamates include the sodium and potassium salts of aceto-, propio-, butyro-, hexano-, heptano-, octano-, nonano-, and decano-, benzo-, toluo-, N-methylaceto-, N-methylbenzo-, N-methyloctano-, N-cyclohexylbenzo-, N-phenylbenzo-, N-p-tolylbenzohydroxamic acids. The most preferred alkali metal hydroxamates are the potassium salts of aceto-, octano-, decano- and benzohydroxamic acids. Generally, the amount of alkali metal hydroxamate employed is between 0.001 part to 5 parts per 100 parts of the isocyanate employed. The preparation of the alkali metal salts of hydroxamic acids was accomplished by following the procedures disclosed in the prior art. See, for example, *Organic Synthesis*, Collective Vol. I, page 67; H.L. Yale, Chem. Reviews, 33, 225 (1943); and O.Exner, Angew. Chem., International Edition, 13, 37 (1974).

Generally, the alkali metal hydroxamates are prepared by the reaction of hydroxylamines and the alkyl esters of carboxylic acids in the presence of alkali metal hydroxides or by the reaction of hydroxylamines with carboxylic acid chlorides. The method employed in the present invention for the preparation of the hydroxamate salts is the reaction of hydroxylamine hydrochloride and the methyl or ethyl ester of the respective carboxylic acid in the presence of KOH. In addition, the N-alkyl alkali metal hydroxamates are prepared by the reaction of N-alkyl or N-arylhydroxylamines with alkyl esters or acid chlorides or carboxylic acids.

The organic polyisocyanates employed in the instant invention correspond to the formula:

$$R''(NCO)_z$$

wherein R'' is a polyvalent organic radical which is either aliphatic, arylalkyl, alkylaryl, aromatic or mixtures thereof and z is an integer which corresponds to the valence of R'' and is at least two. Representative of the organic polyisocyanates contemplated herein includes, for example, the aromatic isocyanates such as 2,4-toluene diisocyanate, 2,6-toluene diisocyanate, mixtures of 2,4- and 2,6-toluene diisocyanate, crude toluene diisocyanate, 4,4'-diphenylmethane diisocyanate, crude 4,4'-diphenylmethane diisocyanate and the like; the aromatic triisocyanate such as 4,4',4''-triphenylmethane triisocyanate, 2,4,6-toluene triisocyanate, the aromatic tetraisocyanate such as 4,4'-dimethyl-2,2',5,5'-diphenylmethane tetraisocyanate, and the like; arylalkyl polyisocyanates such as xylene diisocyanate; aliphatic polyisocyanates such as 1,6-hexamethylene diisocyanate, lycine diisocyanate methylester and the like; and mixtures thereof. Other polyisocyanates include polymethylene polyphenylene polyisocyanate, hydrogenated methylene diphenylene diisocyanate, m-phenylene diisocyanate, 1,5-naphthylene diisocyanate, 1-methoxyphenyl-2,4-diisocyanate, 4,4'-biphenyl diisocyanate, 3,3'-dimethyl-4,4'-biphenyl diisocyanate, and 3,3'-dimethyl-4,4'-diphenylmethane diisocyanate. These polyisocyanates are prepared by conventional methods known in the art such as the phosgenation of the corresponding organic amines. The most preferred polyisocyanates are 4,4'-diphenylmethane diisocyanate in the crude or distilled form, 2,4-toluene diisocyanate, 2,6-toluene diisocyanate and mixtures thereof, or crude toluene diisocyanate. The process of the present invention may also be used in a preparation of isocyanurate-modified urethane quasi-prepolymers.

The isocyanurate-modified isocyanate compositions of the present invention are prepared by heating an organic polyisocyanate containing the alkali metal hydroxamate catalyst at temperatures ranging from 25° C. to 250° C. The preferred reaction temperature is between 50° C. to 230° C. The amount of the alkali metal hydroxamate employed is between 0.001 part to 5 parts per 100 parts of the isocyanate employed. In the preparation of these compositions, the progress of conversion to isocyanurate groups is followed by determining the decrease in the isocyanate content of the reaction mixtures. These isocyanurate products were characterized by infra-red spectral analysis. In addition to the absorptions attributable to the isocyanate groups, these products displayed absorptions at 5.85 and 7.1 microns which are attributable to isocyanurate groups. The isocyanate compounds of the instant invention may be completely or partially converted to the isocyanurate products. The preferred NCO content of the final product when 4,4'-methylene diphenylene diisocyanate is employed as a starting isocyanate is between 31.9 to 25.2 weight percent, i.e., equivalent to a conversion of between 10 and 50 percent of the monomeric diisocyanate to trifunctional isocyanate. Preferably, the isocyanate range is between 31.5 to 28.7 percent by weight, i.e., representing a conversion of between 12 to 30 percent. The preferred NCO content of the final liquid product when toluene diisocyanate is employed as the starting isocyanate is from 45.0 to 36.2 weight percent, i.e., equivalent to a conversion of between 13.6 percent to 50 weight percent of monomeric diisocyanate to trifunctional isocyanate.

After the desired isocyanate level has been reached, the catalyst may be deactivated employing an acid or an acid chloride as is well known in the prior art. The preferred acid is HCl, although other acids such as oxalic acid, phosphoric acid, benzene- or toluenesulfonic acid may be employed. The preferred acid chlorides are acetyl or benzoyl chlorides, although sulfonyl chlorides such as benzenesulfonyl chloride may also be used. Other deactivators are alkylating agents such as dimethyl sulfate, alkyl o,p-toluenesulfonates, methyl chloride and the like as described in U.S. Pat. No. 3,769,318. These products, upon deactivation, are then rapidly cooled to room temperature and stored at ambient temperatures. The stability of the products is determined by analyzing the isocyanate content of the product periodically to determine whether trimerization has ceased. The compositions of the instant invention may be used in the preparation of polyurethane products. The products are particularly useful in the preparation of microcellular foams, molded flexible foams, and the like. Molded flexible foams prepared using isocyanate compositions of the present invention display outstanding humid-aged properties. The microcellular foams prepared from the products of the invention display a good balance of properties. In addition, these latter foams exhibit good resistance to heat sag.

The flexible and microcellular foams of the subject invention may be prepared by condensing the isocyanurate-modified organic polyisocyanate in the presence of a polyol. Any organic compound containing at least two active hydrogen-containing groups, as determined by the well-known Zerewittinof test described by Kohler in *Journal of the American Chemical Society*, Vol. 49, 3181 (1927) may be employed. Urethane catalysts which may be employed in the preparation of the foams are well known in the art and include the metal or organometallic salt of carboxylic acids and tertiary amines. The foams are prepared by mixing together the isocyanurate-modified polyisocyanates, optionally a polyol, water, and catalyst at ambient temperatures. Under such conditions, an exotherm is developed within the reaction system, carbon dioxide is generated and foam formation begins. Alternatively, the foams may be prepared by adding the polyols and the catalysts to the mixture of polyisocyanate and an auxiliary blowing agent, preferably a halohydrocarbon.

Also contemplated are the incorporation of additional ingredients of the foam formulation to tailor the properties thereof. Thus, plasticizers and surfactants, such as silicone surfactants, may be employed in the invention. Further, additional ingredients include inorganic fillers, pigments, flame retardants, U.V. stabilizers and the like.

The following examples are provided to illustrate the principles described herein. All parts are by weight unless otherwise indicated.

EXAMPLE 1

A two-liter reaction vessel equipped with a thermometer, mechanical stirrer, addition funnel, nitrogen inlet, and a reflux condenser, was charged with a mixture of 93.6 parts (1.44 mole) hydroxylamine hydrochloride and 240 milliliters of methanol. The contents were heated to the reflux temperature until all of the hydroxylamine hydrochloride was dissolved. The contents were then cooled to 40° C. and a solution of 134.7 parts (2.04 moles) of potassium hydroxide and 450 mls. of methanol was added dropwise over a period of 15 minutes. Upon completing the addition, the contents were stirred for an additional 5 minutes and thereafter the solution was filtered rapidly to remove the potassium chloride formed. The clear filtrate was collected in a two-liter flask equipped with a thermometer, addition funnel, mechanical stirrer, nitrogen inlet, and a reflux condenser. Stirring was commenced and 121.2 parts (0.6 mole) of ethyl decanoate was added over a period of 15 minutes while the temperature was maintained at 40° C. The contents were then stirred at 40° C. for five hours. The precipitate formed was collected by filtration with a yield of 85.3 grams. This product was then recrystallized from methanol.

EXAMPLE 2

A three-liter reaction vessel equipped with a thermometer, nitrogen inlet, mechanical stirrer, and an air condenser to which was attached a Drierite-packed tube, was charged with 2000 parts of molten pure 4,4'-diphenylmethane diisocyanate and 0.3 parts of the potassium salt of decanohydroxamic acid prepared by the procedure of Example 1. The contents were heated to 220° C. over a period of about 30 minutes and then maintained at that temperature for an additional 30 minutes. Analysis of an aliquot sample indicated the isocyanate content to be 30.4 percent. After 40 additional minutes, analysis of another aliquot sample indicated the isocyanate value was 30.3 percent. The contents were then cooled rapidly to about 80° C. in about 10 minutes. After the product reached room temperature, the isocyanate value was again determined and found to be 30.2 percent. The Brookfield viscosity was determined at 25° C. to be 77 cps. After storing for approximately 7 days at ambient temperatures, the isocyanate value was found to be 30.0 percent. After a storage time of one month, the isocyanate value was found to be 29.4 percent.

EXAMPLE 3

Employing the procedure of Example 1, the potassium salt of benzohydroxamic acid was prepared by reacting hydroxylamine hydrochloride and ethyl benzoate together with potassium hydroxide and methanol. Employing the procedure of Example 2, 2000 parts of pure 4,4'-diphenylmethane diisocyanate and 0.4 part of the potassium salt of benzohydroxamic acid were heated for 2.5 hours at 220° C. Analysis after that time showed that the isocyanate value of the isocyanurate-modified product was 30.3 weight percent. After two days storage at ambient temperature, the product had an isocyanate value of 30.2 percent and a Brookfield viscosity of 90 cps. at 25° C.

EXAMPLE 4

Employing the procedure of Example 1, the potassium salt of octanohydroxamic acid was prepared employing a solution of potassium hydroxide in methanol, hydroxylamine hydrochloride and ethyl octanoate. Further, employing the procedure of Example 3, 800 parts of pure 4,4'-diphenylmethane diisocyanate and 0.12 part of the potassium salt of octanohydroxamic acid were heated at 220° C. for 30 minutes resulting in a product containing 30.9 weight percent isocyanate. After one day's storage at ambient temperatures, the isocyanate value was 30.7 weight percent.

EXAMPLE 5

A 500-milliliter reaction vessel equipped with a mechanical stirrer, nitrogen inlet, thermometer, and an air condenser equipped with a Drierite-filled tube, was charged with a mixture of 400 parts of toluene diisocyanate (80/20 2,4-, 2,6-isomer mixture) and 0.06 part of the potassium salt of decanohydroxamic acid. This mixture was slowly heated to 100° C. and maintained thereat for 1.5 hours. At the end of this time, the isocyanate value was found to be 33.9 weight percent. In order to deactivate the catalyst, 0.4893 part of a 0.4 percent HCl in TDI was added. Thereafter, 1100 parts of TDI (80/20 mixture) was added and mixed thoroughly with the reaction product. The isocyanate value of the reaction mixture at this point was 44.2 weight percent and the Brookfield viscosity was 100 cps at 25° C. After storage at ambient temperatures for three months, the isocyanate value was found to be 43.9 weight percent, indicating excellent storage stability.

EXAMPLES 6–8

A 500-milliliter reaction vessel equipped with a mechanical stirrer, nitrogen inlet, thermometer, and an air condenser equipped with a Drierite-filled tube, was charged with 400 parts of molten pure 4,4'-diphenylmethane diisocyanate and 0.06 parts of potassium decanohydroxamate. This mixture was slowly heated to 220° C. and maintained thereat for 3 hours. Samples were taken for analysis of the isocyanate content at 1 hour intervals. Two other samples were prepared in the same manner. The three samples were stored and analyzed periodically as indicated below in Table I. Only a minor loss of isocyanate content occurred after storage of the samples at ambient temperature conditions for seven months.

TABLE I

| Pag. No. UC-39745 | NCO, % by Weight | | | | | | | |
|---|---|---|---|---|---|---|---|---|
| | 1 hr. at 220° C. | 2 hrs. at 220° C. | 3 hrs. at 220° C. | same day at R.T. | 1 week at R.T. | 1 month at R.T. | 2 months at R.T. | ca. 7 months at R.T. |
| Example 6 | 30.2 | 29.9 | 29.8 | 29.6 | 29.4 | 29.4 | 29.2 | 29.2 |
| Example 7 | 30.0 | 29.8 | 29.6 | 29.5 | 29.2 | 29.3 | 29.1 | 29.1 |
| Example 8 | 30.1 | 29.9 | 29.8 | 29.6 | 29.3 | 29.3 | 29.1 | 29.2 |

EXAMPLES 9–16

A number of microcellular foams were prepared employing isocyanurate-modified diphenylmethane diisocyanate compositions of the previous examples along with various other ingredients. In addition to the ingredients presented in Table II, each formulation comprised 2.0 parts of 25 percent triethylenediamine in 1,4-butanediol, and 0.02 part of dibutyltin dilaurate. The following abbreviations are employed in Tables II and III:

Polyol A—a polyol prepared by the reaction of trimethylolpropane with propylene oxide and ethylene oxide having a molecular weight of 6700 and containing 13 weight percent oxyethylene groups.

Polyol B—a polyol prepared by the reaction of ethylene and propylene oxide with propylene glycol, having a molecular weight of 4100 and containing 20 weight percent oxyethylene groups.

Polyol C—a polyol prepared by the reaction of ethylene and propylene oxide with glycerine having a molecular weight of 6000 and containing 15 weight percent oxyethylene groups.

Polyol D—a polyol prepared by the reaction of ethylene and propylene oxide with trimethylolpropane having a molecular weight of 4800 and containing 13 weight percent oxyethylene groups.

Polyol E—a polyol prepared by the reaction of ethylene and propylene oxide with a mixture of propylene glycol and glycerine having a molecular weight of 4100 containing 15 weight percent oxyethylene groups followed by free radical polymerization therewith of 8 weight percent acrylonitrile and 12 weight percent styrene.

Catalyst A—4 percent triethylenediamine solution in water,

Catalyst B—10 percent triethylenediamine solution in water,

L-5303—polyalkylsiloxane-polyoxyalkylene copolymer,

TDI—a mixture of 80/20 by weight 2,4-, 2,6-toluene diisocyanate.

The physical properties of the foams were determined in accordance with the following ASTM tests:
Density—D-1622-63
Tensile strength—D-1623-72
Elongation—D-412
Split tear—D-470
Graves tear—D-624
Shore "D" hardness—D-676
Flex recovery—D-1623-72
Flex modulus—D-1623-72

TABLE II

| Example: | 9 | 10 | 11 | 12 | 13 | 14 | 15 | 16 |
|---|---|---|---|---|---|---|---|---|
| Ingredients: | | | | | | | | |
| Polyol A, parts | 100 | 100 | 100 | 100 | — | — | — | — |
| Polyol B, parts | — | — | — | — | 100 | 100 | 100 | 100 |
| 1,4-butanediol, parts | 20 | 20 | 25 | 25 | 20 | 20 | 25 | 25 |
| Isocyanate composition of Example | 2 | 3 | 2 | 3 | 2 | 3 | 2 | 3 |
| Isocyanate composition parts per 100 parts of polyol component | 63.6 | 62.5 | 73.7 | 72.8 | 63.5 | 62.7 | 73.9 | 73.0 |
| Properties: | | | | | | | | |
| Density, pcf. | 66.2 | 59.6 | 65.2 | 60.4 | 61.3 | 58.6 | 63.0 | 57.2 |
| Tensile str., psi. | 1600 | 1720 | 1570 | 1950 | 1820 | 1860 | 2170 | 2050 |
| Elongation, % | 60 | 100 | 50 | 80 | 140 | 170 | 110 | 120 |
| Split tear, pi. | 70 | 84 | 72 | 110 | 133 | 95 | 151 | 120 |
| Graves tear, pi. | 300 | 293 | 255 | 310 | 437 | 437 | 460 | 347 |
| Shore D hardness | 48–43 | 43–39 | 47–42 | 45–42 | 52–41 | 41–36 | 60–49 | 49–43 |
| Heat sag, 250° F. | 0.29 | 0.27 | 0.30 | 0.17 | 0.33 | 0.32 | 0.18 | 0.17 |
| Flex recovery | 10/7 | 9/6 | 14/9 | 12/8 | 14/8 | 9/6 | 16/10 | 12/8 |
| Flex modulus | | | | | | | | |
| −20° F. | 35,223 | 30,251 | 48,988 | 38,418 | 49,678 | 23,309 | 74,205 | 41,463 |
| 75° F. | 16,389 | 12,749 | 22,155 | 18,082 | 20,599 | 9,220 | 29,195 | 16,825 |
| 150° F. | 11,014 | 9,619 | 16,220 | 11,701 | 10,296 | 5,964 | 16,325 | 11,953 |
| Ratio −20° F./150° F. | 3.19 | 3.1 | 3.0 | 3.28 | 4.8 | 3.91 | 4.5 | 3.47 |

EXAMPLE 17

A flexible foam was prepared from an isocyanurate-modified toluene diisocyanate to illustrate the utility of said modified isocyanate. The NCO/OH index was 105.

TABLE III

| Example | 17 |
|---|---|
| Polyol C, parts | 30.0 |
| Polyol D, parts | 30.0 |
| Polyol E, parts | 40.0 |
| Catalyst A, parts | — |
| Catalyst B, parts | 3.8 |
| L-5303, parts | 2.0 |
| TDI, parts | — |
| Properties | |
| Density, pcf. | 2.0 |
| Tensile strength, psi. | 15.0 |
| Elongation, % | 103.3 |
| Tear, pi. | 1.1 |
| ILD | |
| 25% defl. | 16.1 |
| 65% | 66.5 |
| 25% return | 12.2 |
| Sag factor | 4.1 |
| Guide factor | 7.9 |
| Recovery, % | 76 |
| CLD, 50% defl. | 0.513 |
| humid-aged 5 hrs. (250° F.) | 0.516 |
| % of original CLD | 101 |
| Compression sets, % | |
| 50% | 13.3 |
| 75% | 61.5 |
| 90% | 84.8 |
| humid aged 5 hours (250° F.) | |
| 50% | 34.7 |
| 75% | 33.4 |
| 90% | 70.5 |

TABLE III-continued

| Example | 17 |
|---|---|
| Tensile strength, psi. heat aged 22 hrs. (284° F.) | 12.5 |

The embodiments of the invention in which an exclusive property or privilege is claimed are defined as follows:

1. A highly stable liquid isocyanurate-modified polyisocyanate composition prepared by heating an organic polyisocyanate at a temperature between 25° C. and 250° C. for a period of from one-half to five hours in the presence of a catalytic amount of an alkali metal or an alkaline earth metal hydroxamate selected from the group consisting of a compound described by the following formula:

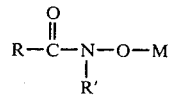

wherein R is alkyl, alkenyl, or alkynyl containing 1 to 10 carbon atoms, phenyl, tolyl, or benzyl, R' is H, alkyl, alkenyl, or alkynyl containing 1 to 10 carbon atoms, phenyl, tolyl, or benzyl, M is an alkali metal or an alkaline earth metal, and a compound described by the following formula:

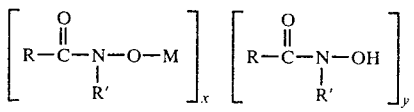

wherein R, R' and M are as defined above, x is 1 and y is any number from 0 to 2.

2. The polyisocyanate composition of claim 1 wherein said organic polyisocyanate is 4,4'-diphenylmethane diisocyanate.

3. The polyisocyanate composition of claim 1 wherein said organic polyisocyanate is toluene diisocyanate.

4. The isocyanurate-modified polyisocyanate composition of claim 1 wherein said alkali metal hydroxamate is selected from the group consisting of potassium acetohydroxamate, potassium octanohydroxamate, potassium decanohydroxamate and potassium benzohydroxamate.

5. The isocyanurate-modified polyisocyanate composition of claim 1 wherein the concentration of said catalyst is from 0.001 part to 5.0 parts per 100 parts of said organic polyisocyanate.

6. A process for preparing a highly stable liquid isocyanurate-modified polyisocyanate composition prepared by heating an organic polyisocyanate at a temperature between 25° C. and 250° C. for a period of from one-half to five hours in the presence of a catalytic amount of an alkali metal or an alkaline earth metal hydroxamate selected from the group consisting of a compound described by the following formula:

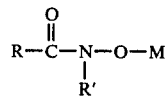

wherein R is alkyl, alkenyl, or alkynyl containing 1 to 10 carbon atoms, phenyl, tolyl, or benzyl, R' is H, alkyl, alkenyl, or alkynyl containing 1 to 10 carbon atoms, phenyl, tolyl or benzyl, M is an alkali metal or an alkaline earth metal, and a compound described by the following formula:

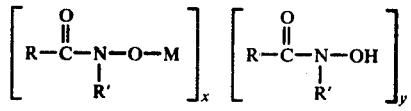

wherein R, R', and M are as defined above, x is 1 and y is any number from 0 to 2.

7. The process of claim 6 wherein said organic polyisocyanate is 4,4'-diphenylmethane diisocyanate.

8. The process of claim 6 wherein said organic polyisocyanate is toluene diisocyanate.

9. The process of claim 6 wherein said alkali metal hydroxamate is selected from the group consisting of potassium acetohydroxamate, potassium octanohydroxamate, potassium decanohydroxamate and potassium benzohydroxamate.

10. The process of claim 6 wherein the concentration of said catalyst is from 0.001 part to 5.0 parts per 100 parts of said organic polyisocyanate.

* * * * *